United States Patent
Okumura

(10) Patent No.: US 9,066,038 B2
(45) Date of Patent: Jun. 23, 2015

(54) IMAGE PROCESSING AND SCANNING APPARATUS IDENTIFYING POINTS HAVING MAXIMUM DENSITY ALONG A SCANNING DIRECTION SO THAT BINDING POSITION OF INPUT IMAGE IS IDENTIFIED

(71) Applicant: KYOCERA Document Solutions Inc., Tamatsukuri, Chuo-ku, Osaka-shi, Osaka (JP)

(72) Inventor: Ryuichi Okumura, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/138,289

(22) Filed: Dec. 23, 2013

(65) Prior Publication Data

US 2014/0177009 A1 Jun. 26, 2014

(30) Foreign Application Priority Data

Dec. 25, 2012 (JP) .................................. 2012-281764

(51) Int. Cl.
*H04N 1/38* (2006.01)
*H04N 1/409* (2006.01)
*H04N 1/387* (2006.01)
*H04N 1/401* (2006.01)
*G06K 9/00* (2006.01)

(52) U.S. Cl.
CPC ............. *H04N 1/409* (2013.01); *H04N 1/3878* (2013.01); *H04N 1/401* (2013.01); *G06K 9/00442* (2013.01); *H04N 2201/0434* (2013.01)

(58) Field of Classification Search
None
See application file for complete search history.

(56) References Cited

U.S. PATENT DOCUMENTS

| | | | | |
|---|---|---|---|---|
| 6,330,050 | B1 * | 12/2001 | Takahashi et al. | 355/25 |
| 7,430,065 | B2 * | 9/2008 | Arakai et al. | 358/3.26 |
| 8,472,069 | B2 * | 6/2013 | Yamazaki | 358/1.5 |
| 2013/0063795 | A1 * | 3/2013 | Shimatani | 358/505 |

FOREIGN PATENT DOCUMENTS

| | | |
|---|---|---|
| JP | H11-041455 | 2/1999 |
| JP | 2004-088499 | 3/2004 |
| JP | 2005-109807 | 4/2005 |

* cited by examiner

*Primary Examiner* — Steven Kau

(57) ABSTRACT

An image processing apparatus includes a local maximum point identifying unit, a distribution deriving unit, and a binding position identifying unit. The local maximum point identifying unit is configured to identify positions of local maximum points of densities along a first scanning direction in an input image of a book. The distribution deriving unit is configured to derive a distribution in the first scanning direction of the number of the local maximum point obtained along a second scanning direction perpendicular to the first scanning direction. The binding position identifying unit is configured to identify a binding position in the input image of the book on the basis of a position of a peak in the distribution.

3 Claims, 8 Drawing Sheets

FIG. 4

| DENSITY VARIATION PATTERN | | LOCAL MAXIMUM POINT WEIGHT |
|---|---|---|
| DENSITY RELATION | SHAPE | |
| A < B > C | ∧ | 1 |
| A = B > C | ⌐\ | 1 |
| A < B = C | /⌐ | 1 |
| A < B < C | / | 0 |
| A > B > C | \ | 0 |
| A = B < C | _/ | 0 |
| A > B = C | \_ | 0 |
| A > B < C | ∨ | 0 |
| A = B = C | — | 0 |

IMAGE PROCESSING AND SCANNING APPARATUS IDENTIFYING POINTS HAVING MAXIMUM DENSITY ALONG A SCANNING DIRECTION SO THAT BINDING POSITION OF INPUT IMAGE IS IDENTIFIED

CROSS-REFERENCE TO RELATED APPLICATIONS

This application relates to and claims priority rights from Japanese Patent Application No. 2012-281764, filed on Dec. 25, 2012, the entire disclosures of which are hereby incorporated by reference herein.

BACKGROUND

1. Field of the Present Disclosure

The present disclosure relates to an image processing apparatus and an image scanning apparatus.

2. Description of the Related Art

When an image of a book, particularly a thick book having a lot of pages is scanned using an image scanning apparatus such as a copier or a scanner, the book is put on a platen glass so as to open the book at a desired page and the page is scanned. In that time, if a binding part of the book is away over the platen glass, a noise appears as black pixels at the binding part in a document image. Such noise is unnecessary to a user, and therefore, it is favorable that such noise is eliminated automatically.

An image scanning apparatus (a) derives values obtained by integrating densities along a coordinate substantially parallel to a binding part in a document image at each position along a coordinate substantially perpendicular to the binding part, (b) generates a spatial frequency distribution by performing Fourier transformation of a distribution of the values, and (c) cancels a noise and detects the binding part by performing inverse Fourier transformation of a peak part in the spatial frequency distribution.

However, in the aforementioned technique, the Fourier transformation and the inverse Fourier transformation must be performed to detect the binding part (i.e. the binding part in the document image), and consequently, since complicated computation is required, it results in large circuit scale, long computation time, and so forth.

SUMMARY

An image processing apparatus according to an aspect of the present disclosure includes a local maximum point identifying unit, a distribution deriving unit, and a binding position identifying unit. The local maximum point identifying unit is configured to identify positions of local maximum points of densities along a first scanning direction in an input image of a book. The distribution deriving unit is configured to derive a distribution in the first scanning direction of the number of the local maximum point obtained along a second scanning direction perpendicular to the first scanning direction. The binding position identifying unit is configured to identify a binding position in the input image of the book on the basis of a position of a peak in the distribution.

Therefore, a binding position in the input image of the book is precisely identified without complicated computation.

An image scanning apparatus according to an aspect of the present disclosure includes the aforementioned image processing apparatus, and a scanner unit configured to scan the input image from the book.

These and other objects, features and advantages of the present disclosure will become more apparent upon reading of the following detailed description along with the accompanied drawings.

BRIEF DESCRIPTION OF THE DRAWINGS

FIG. 4 shows a diagram that indicates an example of a relationship between density variation patterns and local maximum point weights used by the local maximum point identifying unit shown in FIG. 2;

DETAILED DESCRIPTION

Hereinafter, an embodiment according to an aspect of the present disclosure will be explained with reference to drawings.

Embodiment 1

Figure 1:
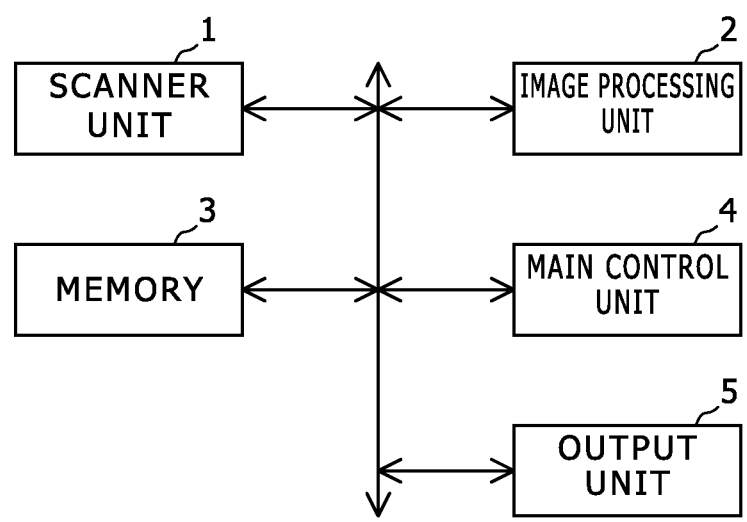
FIG. 1 shows a block diagram which indicates a configuration of an image scanning apparatus according to an embodiment of the present disclosure.

FIG. 1 shows a block diagram which indicates a configuration of an image scanning apparatus according to an embodiment of the present disclosure. The image scanning apparatus shown in FIG. 1 includes a scanner unit 1, an image processing unit 2, a memory 3, a main controller 4, and an output unit 5.

The scanner unit 1 optically scans a page image of a document, and generates and outputs image data of the page image (i.e. an input image). The image data is data that includes image information at each pixel (e.g. RGB value).

Further, the image processing unit 2 performs a predetermined process for the image data of the input image. The image processing unit 2 performs a predetermined process for image data outputted by the scanner unit 1 or image data obtained by performing a preprocess for image data outputted by the scanner unit 1. The image processing unit 2 writes the image data for which the predetermined process has been performed into a predetermined memory area in the memory 3. For example, the image processing unit 2 is composed of one or more ASICs (Application Specific Integrated Circuits).

Figure 2:
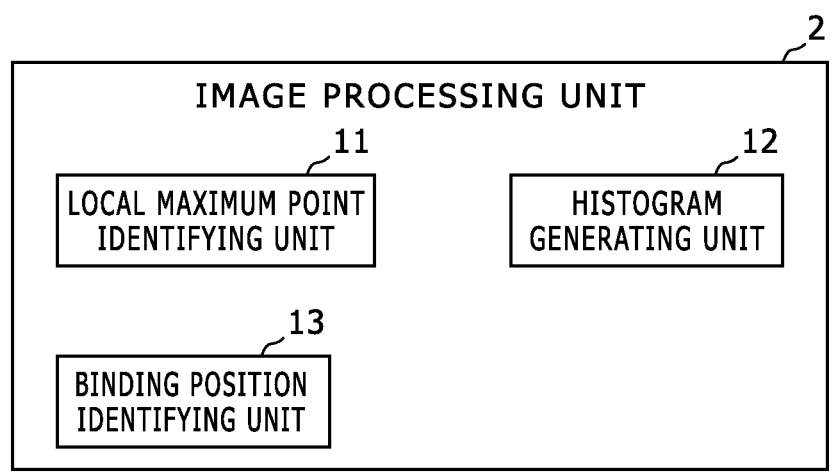
FIG. 2 shows a block diagram that indicates a configuration of the image processing unit shown in FIG. 1.
Figure 3:
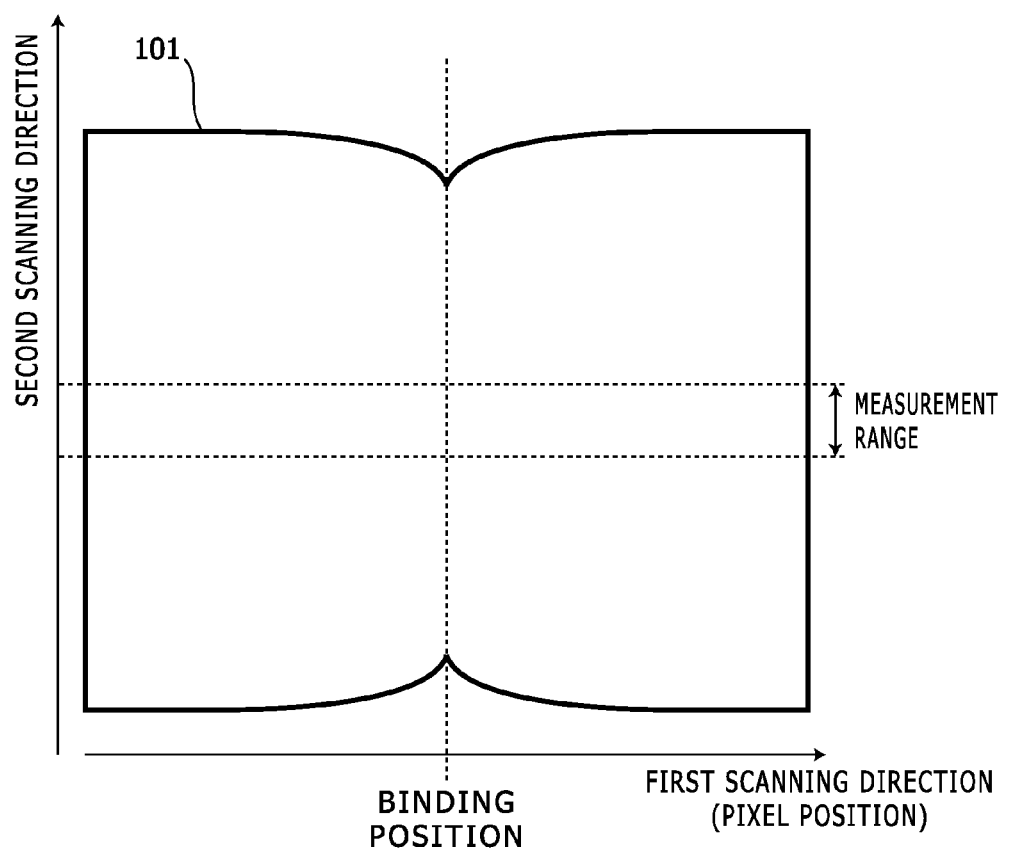
FIG. 3 shows an example of an input image of a book.

FIG. 2 shows a block diagram that indicates a configuration of the image processing unit 2 shown in FIG. 1. FIG. 3 shows an example of an input image of a book.

The image processing unit 2 includes a local maximum point identifying unit 11, a histogram generating unit 12, and a binding position identifying unit 13.

The local maximum point identifying unit 11 identifies positions of local maximum points of densities in each line along a first scanning direction (a scanning direction substantially perpendicular to a binding position) in an input image 101 of a book.

In this embodiment, the local maximum point identifying unit 11 focuses on and moves an objective pixel in turn along the first scanning direction, and identifies whether the objective pixel is the local maximum point or not on the basis of a density variation pattern on three pixels: the objective pixel and forward and backward pixels away from the objective pixel by a predetermined interval (e.g. 10 pixels) in the first scanning direction. This interval is changed accordingly to a condition such as a resolution of the input image.

Specifically, the local maximum point identifying unit 11 identifies that the objective pixel is the local maximum point if neither of densities of the forward and backward pixels is higher than a density of the objective pixel and at least one of the densities of the forward and backward pixels is lower than the density of the objective pixel, and otherwise the local maximum point identifying unit 11 identifies that the objective pixel is not the local maximum point.

FIG. 4 shows a diagram that indicates an example of a relationship between density variation patterns and local maximum point weights used by the local maximum point identifying unit 11 shown in FIG. 2. In FIG. 4, "B" means a density of an objective pixel, "A" means a density of a backward pixel away from the objective pixel by the predetermined number of pixels, and "C" means a density of a forward pixel away from the objective pixel by the predetermined number of pixels. As shown in FIG. 4, if it is identified that an objective pixel is a local maximum point, then a local maximum point weight of the objective pixel is set as 1, and otherwise a local maximum point weight of the objective pixel is set as 0.

The histogram generating unit 12 derives a distribution in the first scanning direction of the number of the local maximum point obtained along a second scanning direction perpendicular to the first scanning direction (i.e. a distribution of the number of local maximum points).

In other words, a summation of the aforementioned local maximum point weights along the second scanning direction is derived as the number of local maximum points at each pixel position in the first scanning direction.

In this embodiment, the histogram generating unit 12 identifies whether or not at least one local maximum point exists at a position in the first scanning direction of plural lines that are parallel to the first scanning direction and arranged along the second scanning direction, identifies the number of local maximum points at the position, and generates a histogram of the number of local maximum points.

In this embodiment, the histogram generating unit 12 derives a distribution in the first scanning direction of the number of the local maximum point within a center partial range (here, a measurement range shown in FIG. 3, e.g. 1000 lines) in the second scanning direction.

The binding position identifying unit 13 identifies a binding position in the input image 101 of the book on the basis of a position of a peak in the distribution of the number of local maximum points obtained by the histogram generating unit 12.

Returning to FIG. 1, the memory 3 is a volatile memory such as a DRAM (Dynamic Random Access Memory). In the memory 3, allocated is a memory area required for a process of the image processing unit 2 and so forth.

Further, the main controller 4 controls the scanner unit 1, the image processing unit 2, the memory 3, and the output unit 5.

Furthermore, the output unit 5 outputs image data for which the image processing unit 2 has performed image processing.

In the following part, a behavior of the aforementioned image scanning apparatus is explained.

When a user puts a book on a platen glass of the scanner unit 1 and performs a predetermined operation, the scanner unit 1 scans an image of the book and outputs image data of the input image to the image processing unit 2.

Figure 5:
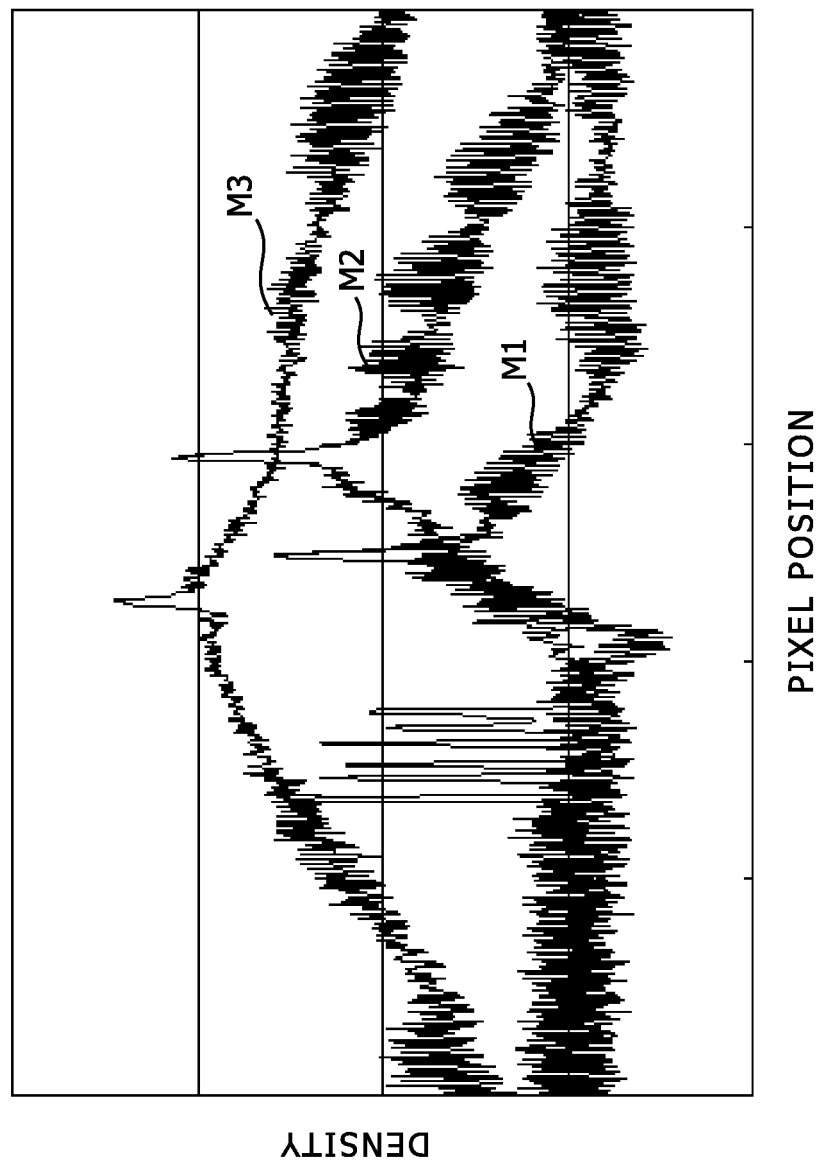
FIG. 5 shows a diagram that explains a relationship between pixel positions and densities in an input image of a book spread out and put on a platen glass (a contact glass)

FIG. 5 shows a diagram that explains a relationship between pixel positions and densities in an input image of a book spread out and put on a platen glass (a contact glass). The pixel positions indicate positions in the first scanning direction as shown in FIG. 3.

The characteristic M1 in FIG. 5 indicates an example of a relationship between pixel positions and densities in an input image obtained when a user presses down a book put on the platen glass with a document cover (including an auto document feeder). In this case, the document cover partly blocks off ambient light that should enter into the platen glass.

The characteristic M2 in FIG. 5 indicates an example of a relationship between pixel positions and densities in an input image obtained when a user presses down a book put on the platen glass without a document cover (including an auto document feeder) but with a user's hand. In this case, the document cover does not block off ambient light that should enter into the platen glass. In addition, in this case, the user's hand directly presses down the book, and therefore, a rise of the binding part from the platen glass is small.

The characteristic M3 in FIG. 5 indicates an example of a relationship between pixel positions and densities in an input image obtained when a book put on the platen glass is not pressed with a document cover (including an auto document feeder) or a user's hand. In this case, the document cover does not block off ambient light that should enter into the platen glass. In addition, in this case, neither the document cover nor the user's hand presses down the book, and therefore, a rise of the binding part from the platen glass is larger than those in the cases of the characteristics M1 and M2.

Thus, the characteristics M1, M2, and M3 result in different rises of the binding part, and therefore, result in different density parts of the binding part. Specifically, the rise amount increases along the order of the characteristic M1, the characteristic M2, the characteristic M3, and consequently the density of the binding part increases along this order.

In the image processing unit 2, in the aforementioned manner, the local maximum point identifying unit 11 identifies positions of local maximum points of densities in each line along the first scanning direction in the input image of the book.

Subsequently, the histogram generating unit 12 derives a distribution in the first scanning direction of the number of the local maximum point obtained along the second scanning direction perpendicular to the first scanning direction.

The binding position identifying unit 13 identifies a binding position in the input image of the book on the basis of a position of a peak in the distribution of the number of local maximum points obtained by the histogram generating unit 12.

The binding position found in this manner is used in subsequent image processing.

Figure 6:
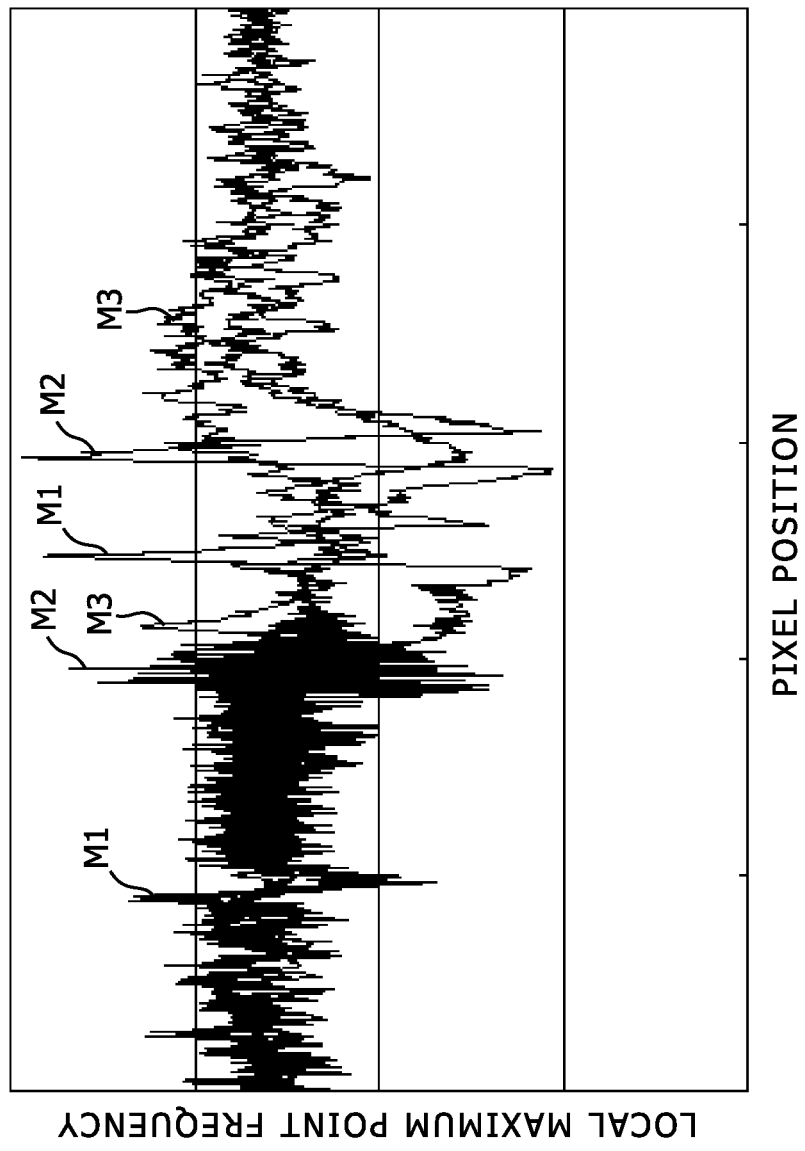
FIG. 6 shows a diagram that indicates an example of a distribution of local maximum point frequencies (i.e. the number of local maximum points) in a whole range of a tilting input image of the book.
Figure 7:
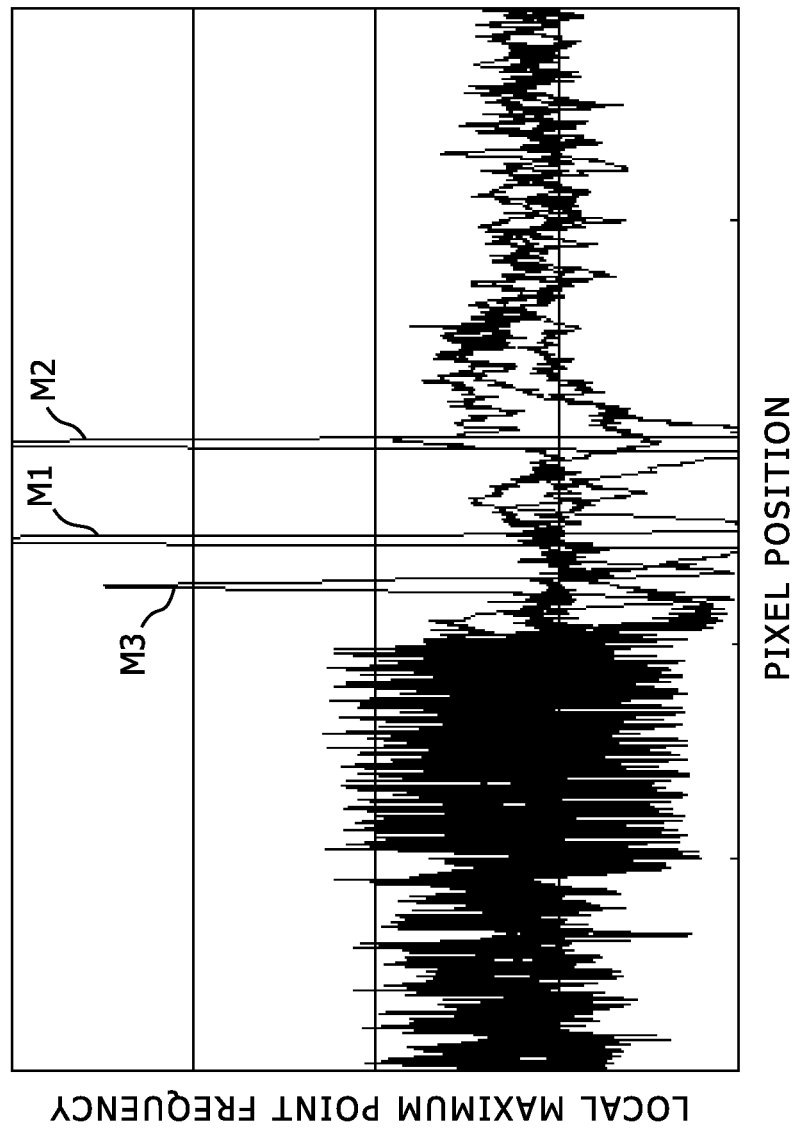
FIG. 7 shows a diagram that indicates an example of a distribution of local maximum point frequencies (i.e. the number of local maximum points) in a partial range in the second scanning direction of the tilting input image of the book.

FIG. 6 shows a diagram that indicates an example of a distribution of local maximum point frequencies (i.e. the number of local maximum points) in a whole range of a tilting input image 101 of the book. FIG. 7 shows a diagram that indicates an example of a distribution of local maximum point frequencies (i.e. the number of local maximum points) in a partial range in the second scanning direction (a measurement range shown in FIG. 3) of the tilting input image 101 of the book. It should be noted that the characteristics M1 to M3 in FIG. 6 and FIG. 7 correspond to the characteristics M1 to M3 in FIG. 5, respectively. In addition, when the input image 101 of the book does not tilt, a peak appears in the local maximum point frequency distribution more clearly than in the distribution shown in FIG. 6.

When the input image 101 of the book tilts, it is difficult to identify a peak of the local maximum point frequencies shown in FIG. 6, but as shown in FIG. 7 the histogram generating unit 12 derives local maximum point frequencies from a partial range (the measurement range in FIG. 3) in the second scanning direction, and consequently founds a clear peak; and therefore, it is possible to precisely identify a peak position (i.e. binding position) using a single threshold value for the aforementioned sorts of cases.

In the aforementioned Embodiment 1, the local maximum point identifying unit 11 identifies positions of local maximum points of densities along the first scanning direction in the input image 101 of the book. The histogram generating unit 12 derives a distribution in the first scanning direction of the number of the local maximum point obtained along the second scanning direction perpendicular to the first scanning direction. The binding position identifying unit 13 identifies a binding position in the input image of the book on the basis of a position of a peak in the distribution.

Therefore, a binding position in the input image 101 of the book is precisely identified without complicated computation.

Embodiment 2

Figure 8:
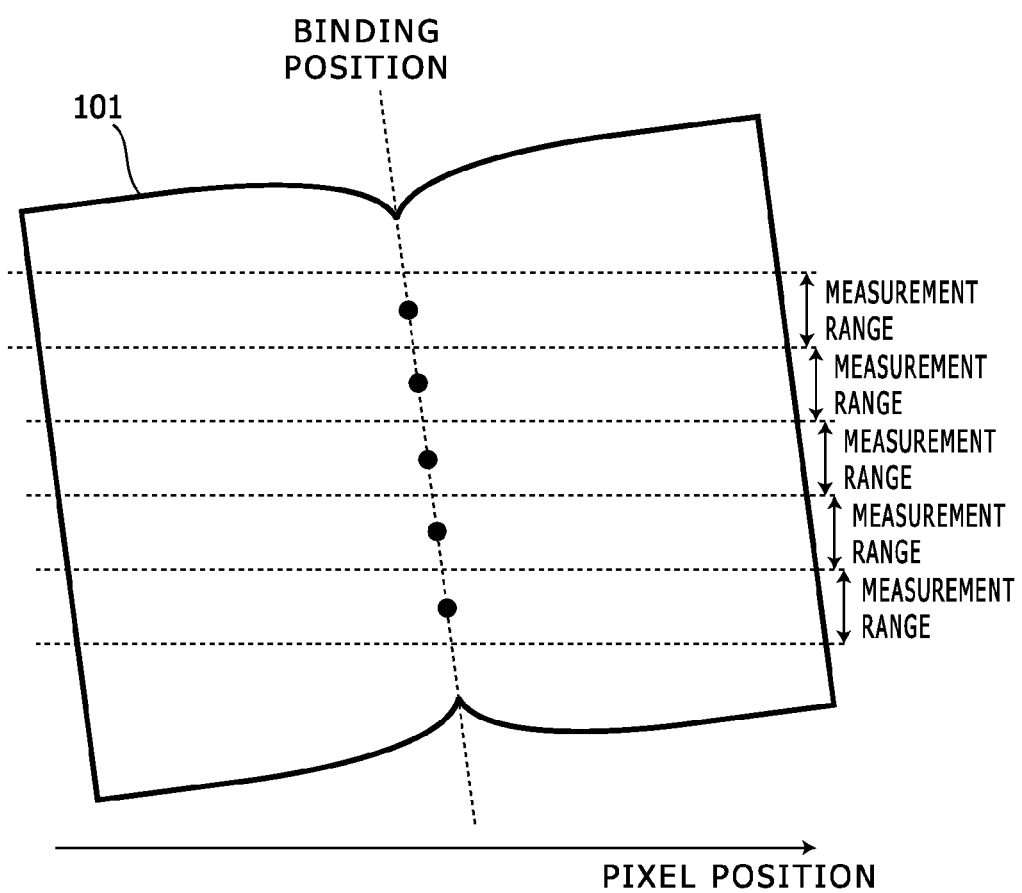
FIG. 8 shows a diagram that explains a binding position identified by an image scanning apparatus in Embodiment 2.

FIG. 8 shows a diagram that explains a binding position identified by an image scanning apparatus in Embodiment 2.

The image scanning apparatus in Embodiment 2, the histogram generating unit 12 derives distributions in the first scanning direction of the number of the local maximum point correspondingly to respective plural partial ranges (plural measurement ranges in FIG. 8 of which each one has e.g. 1000 lines) in the second scanning direction; and the binding position identifying unit 13 detects a tilt of the input image of the book to the first scanning direction and/or the second scanning direction by identifying respective binding positions corresponding to the plural partial ranges on the basis of peak positions in the plural distributions of the plural partial ranges. As shown in FIG. 8, respective pixel positions at the peaks are identified in the plural measurement ranges, and an angle between a straight line which passes through these pixel positions and the first scanning direction or the second scanning direction is identified as a tilting angle of the input image of the book.

Other parts of the configuration of the image scanning apparatus in Embodiment 2 is identical to that in Embodiment 1, and therefore, it is not explained here.

In the aforementioned Embodiment 2, a binding position and a tilt of the input image 101 of the book are precisely derived.

The description has been presented for purposes of illustration and description, and is not intended to be exhaustive or limited to the present disclosure.

The present disclosure can be applied to an image scanning apparatus such as a scanner machine, a copier, or a multi function peripheral.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
    a local maximum point identifying unit configured to identify positions of local maximum points of densities along a first scanning direction in an input image of a book;
    a distribution deriving unit configured to derive a distribution in the first scanning direction of the number of the local maximum point obtained along a second scanning direction perpendicular to the first scanning direction;
    a binding position identifying unit configured to identify a binding position in the input image of the book on the basis of a position of a peak in the distribution;
    wherein the local maximum point identifying unit is further configured to identify (a) whether an objective pixel is the local maximum point or not on the basis of a density variation pattern on three pixels: the objective pixel and forward and backward pixels away from the objective pixel by a predetermined interval in the first scanning direction and (b) that an objective pixel is the local maximum point if neither of densities of the forward and backward pixels is higher than a density of the objective pixel and at least one of the densities of the forward and backward pixels is lower than the density of the objective pixel;
    the distribution deriving unit is further configured to derive distributions in the first scanning direction of the number of the local maximum point correspondingly to respective plural partial ranges in the second scanning direction; and
    the binding position identifying unit is further configured to detect a tilt of the input image of the book to the first scanning direction and/or the second scanning direction by identifying respective binding positions corresponding to the plural partial ranges on the basis of peak positions in the plural distributions of the plural partial ranges.

2. The image processing apparatus according to claim 1, wherein the distribution deriving unit is further configured to derive a distribution in the first scanning direction of the number of the local maximum point within a center partial range in the second scanning direction.

3. An image scanning apparatus, comprising:
    an image processing apparatus; and
    a scanner unit configured to acquire an input image by scanning a book;
    wherein the image processing apparatus comprises:
        a local maximum point identifying unit configured to identify positions of local maximum points of densities along a first scanning direction in the input image;
        a distribution deriving unit configured to derive a distribution in the first scanning direction of the number of the local maximum point obtained along a second scanning direction perpendicular to the first scanning direction;
        a binding position identifying unit configured to identify a binding position in the input image on the basis of a position of a peak in the distribution; and wherein the local maximum point identifying unit is further configured to identify (a) whether an objective pixel is the local maximum point or not on the basis of a density variation pattern on three pixels: the objective pixel and forward and backward pixels away from the objective pixel by a predetermined interval in the first scanning direction and (b) that an objective pixel is the local maximum point if neither of densities of the forward and backward pixels is higher than a density of the objective pixel and at least one of the densities of the forward and backward pixels is lower than the density of the objective pixel;

the distribution deriving unit is further configured to derive distributions in the first scanning direction of the number of the local maximum point correspondingly to respective plural partial ranges in the second scanning direction; and the binding position identifying unit is further configured to detect a tilt of the input image of the book to the first scanning direction and/or the second scanning direction by identifying respective binding positions corresponding to the plural partial ranges on the basis of peak positions in the plural distributions of the plural partial ranges.

* * * * *